US008761246B2

(12) United States Patent
Yamori et al.

(10) Patent No.: US 8,761,246 B2
(45) Date of Patent: Jun. 24, 2014

(54) ENCODING/DECODING DEVICE, ENCODING/DECODING METHOD AND STORAGE MEDIUM

(75) Inventors: Akihiro Yamori, Kawasaki (JP); Satoshi Shimada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 404 days.

(21) Appl. No.: 12/396,089

(22) Filed: Mar. 2, 2009

(65) Prior Publication Data
US 2009/0296809 A1 Dec. 3, 2009

(30) Foreign Application Priority Data

May 28, 2008 (JP) ................................. 2008-139739

(51) Int. Cl.
H04N 7/12 (2006.01)
G06K 9/36 (2006.01)
H04N 5/228 (2006.01)
H04N 9/77 (2006.01)
H04N 9/64 (2006.01)
H04N 1/60 (2006.01)
H04N 7/26 (2006.01)

(52) U.S. Cl.
CPC ................. *H04N 9/77* (2013.01); *H04N 9/646* (2013.01); *H04N 1/6005* (2013.01); *H04N 19/00315* (2013.01); *H04N 19/00157* (2013.01)
USPC ..................... 375/240.03; 382/166; 348/222.1

(58) Field of Classification Search
CPC ............ H04N 1/6005; H04N 7/26127; H04N 7/26148; H04N 7/26292; H04N 9/646; H04N 96/77; H04N 9/793; H04N 19/00315; H04N 19/00157

USPC ................................................ 375/240.01–29
See application file for complete search history.

(56) References Cited

U.S. PATENT DOCUMENTS

| 5,930,397 | A | 7/1999 | Tsujii et al. | |
|---|---|---|---|---|
| 6,167,087 | A | 12/2000 | Kato | |
| 6,317,141 | B1 * | 11/2001 | Pavley et al. | 715/732 |
| 7,035,459 | B2 | 4/2006 | Ishiga | |
| 2003/0026477 | A1 * | 2/2003 | Ishiga | 382/166 |
| 2003/0095603 | A1 * | 5/2003 | Lan et al. | 375/240.17 |
| 2004/0141067 | A1 * | 7/2004 | Nakayama et al. | 348/222.1 |
| 2006/0125963 | A1 * | 6/2006 | Baek | 348/631 |
| 2007/0196023 | A1 * | 8/2007 | Hama et al. | 382/232 |

FOREIGN PATENT DOCUMENTS

| CN | 1214598 A | 4/1999 |
|---|---|---|
| CN | 1943221 A | 4/2007 |
| EP | 0 888 000 A2 | 12/1998 |
| EP | 1 401 211 A2 | 3/2004 |

(Continued)

OTHER PUBLICATIONS

Chinese Office Action issued Nov. 9, 2010 in corresponding Chinese Patent Application 200910119642.2.

(Continued)

*Primary Examiner* — Sath V Perungavoor
*Assistant Examiner* — Xiaolan Xu
(74) *Attorney, Agent, or Firm* — Staas & Halsey LLP

(57) ABSTRACT

This is an encoding device for compressing/encoding an input video signal. The encoding device comprises a reduction/conversion unit for converting the format of either a luminance component or a chrominance component according to the characteristic of the input video signal and an encoding unit for compressing/encoding the video signal whose format is converted by the reduction/conversion unit to generate encoded data.

16 Claims, 16 Drawing Sheets

(56) References Cited

FOREIGN PATENT DOCUMENTS

| | | |
|---|---|---|
| EP | 1 744 541 A1 | 1/2007 |
| JP | 9-70044 | 3/1997 |
| JP | 10-117354 | 5/1998 |
| JP | 10-164581 | 6/1998 |
| JP | 11-196437 | 7/1999 |
| JP | 2003-47024 | 2/2003 |
| JP | 2005-303710 | 10/2005 |
| JP | 2007-53788 | 3/2007 |
| JP | 2007-151134 | 6/2007 |
| JP | 2007-228626 | 9/2007 |
| WO | 02/100116 A1 | 12/2002 |

OTHER PUBLICATIONS

Japanese Office Action issued Aug. 21, 2012 in corresponding Japanese Patent Application No. 2008-139739.
Partial European Search Report dated Mar. 4, 2013, issued in corresponding European Patent Application No. 09002951.3.
A. Wong et al.; "Pratical Content-Adaptive Subsampling for Image Video Compression"; Proceedings of the Eighth IEEE International Symposium on Multimedia (ISM '06); 2006; pp. 1-7.
Extended Search Report issued Jun. 28, 2013 in corresponding European Application No. 09002951.3.
Chinese Office Action mailed Jan. 21, 2014 in corresponding Chinese Application No. 200910119642.2.

* cited by examiner

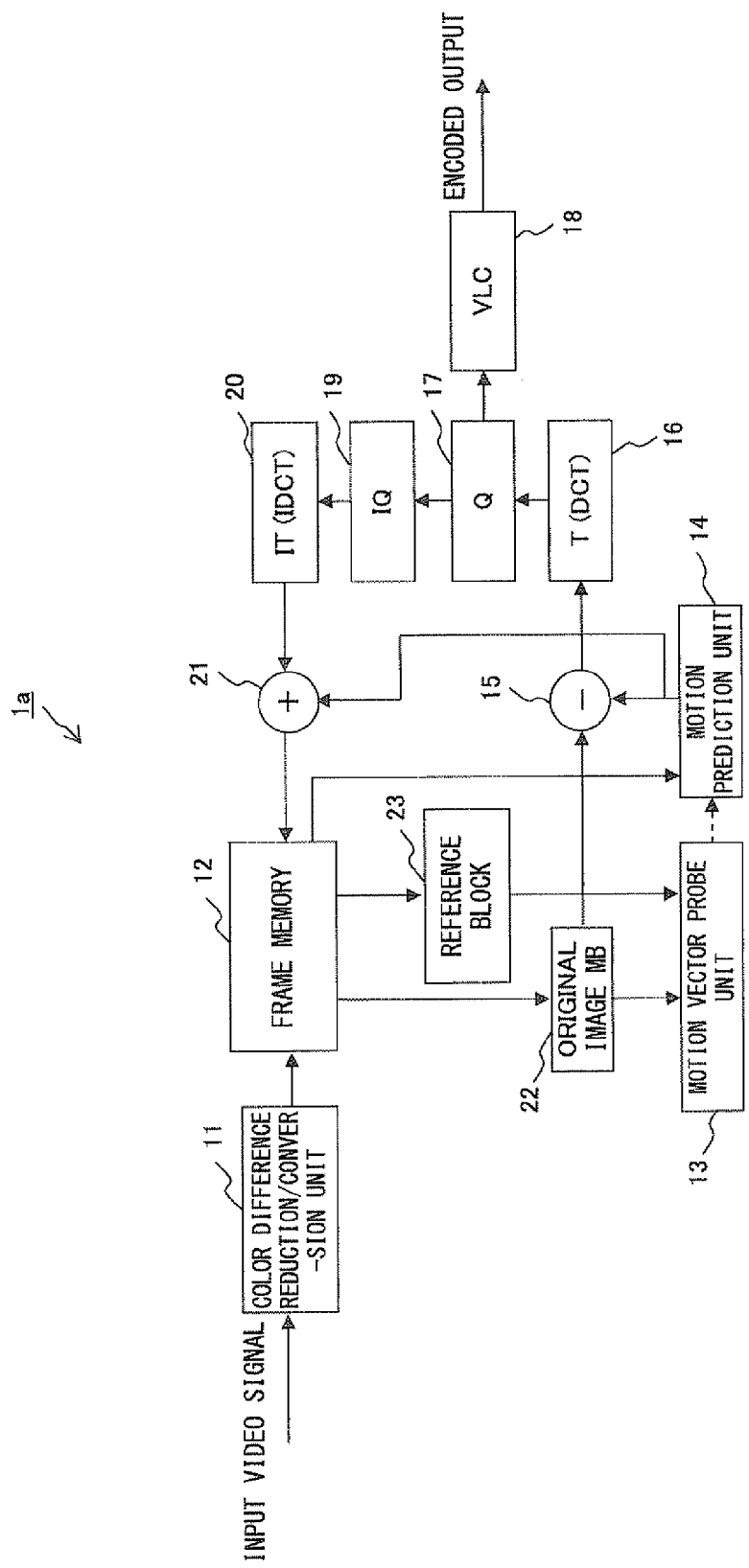
F I G. 2

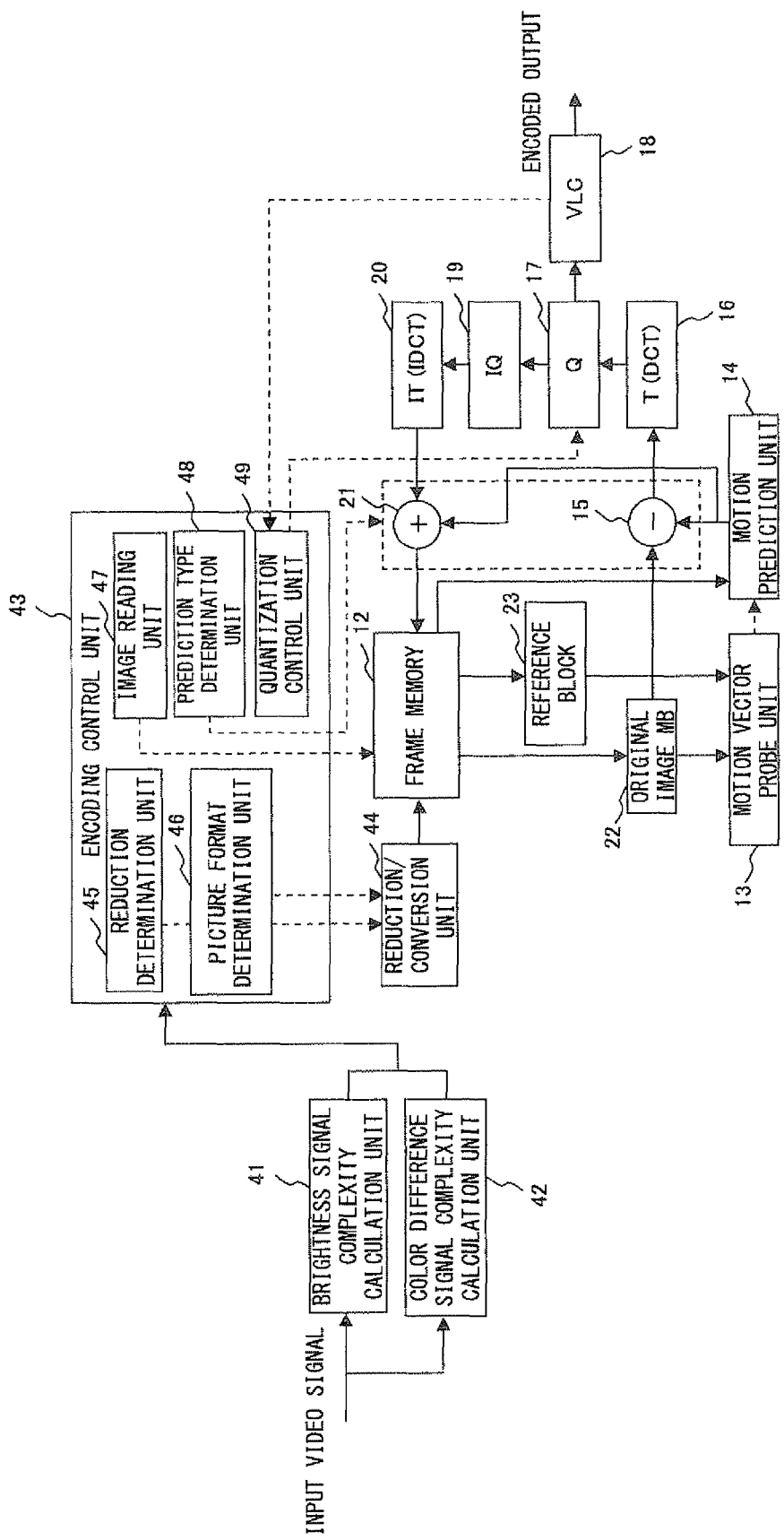
F I G. 4

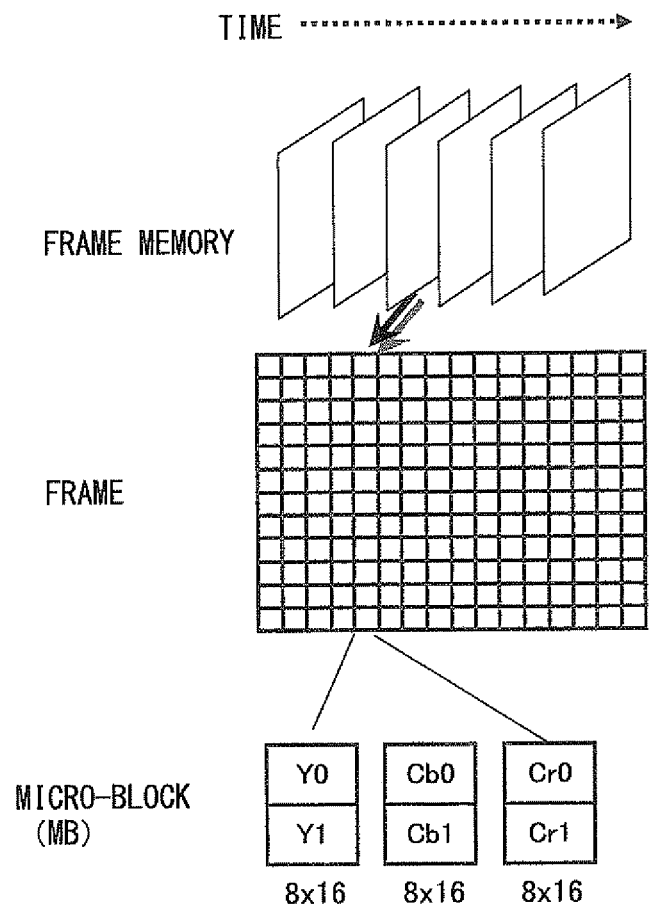
F I G. 7

| sequence_extension() { | No. of bits | Mnemonic |
|---|---|---|
| extension_start_code | 32 | bslbf |
| extension_start_code_identifier | 4 | uimsbf |
| profile_and_level_indication | 8 | uimsbf |
| progressive_sequence | 1 | uimsbf |
| chroma_format | 2 | uimsbf |
| horizontal_size_extension | 2 | uimsbf |
| vertical_size_extension | 2 | uimsbf |
| bit_rate_extension | 12 | uimsbf |
| marker_bit | 1 | bslbf |
| vbv_buffer_size_extension | 8 | uimsbf |
| low_delay | 1 | uimsbf |
| frame_rate_extension_n | 2 | uimsbf |
| frame_rate_extension_d | 5 | uimsbf |
| next_start_code() | | |
| } | | |

| chroma_format | Meaning |
|---|---|
| 00 | 2:2:2 |
| 01 | 4:2:0 |
| 10 | 4:2:2 |
| 11 | 4:4:4 |

F I G. 1 3 A

| chroma_format | Meaning |
|---|---|
| 000 | Reserved |
| 001 | 4:2:0 |
| 010 | 4:2:2 |
| 011 | 4:4:4 |
| 100 | 2:2:2 |

F I G. 1 3 B

| picture_coding_extension() { | No . of bits | Mnemonic |
|---|---|---|
| extension_start_code | 32 | bslbf |
| extension_start_code_identifier | 4 | uimsbf |
| f_code[0][0] /* forward horizontal */ | 4 | uimsbf |
| f_code[0][1] /* forward vertical */ | 4 | uimsbf |
| f_code[1][0] /* backward horizontal */ | 4 | uimsbf |
| f_code[1][1] /* backward vertical */ | 4 | uimsbf |
| intra_dc_precision | 2 | uimsbf |
| picture_structure | 2 | uimsbf |
| top_field_first | 1 | uimsbf |
| frame_pred_frame_dct | 1 | uimsbf |
| concealment_motion_vectors | 1 | uimsbf |
| q_scale_type | 1 | uimsbf |
| intra_vlc_format | 1 | uimsbf |
| alternate_scan | 1 | uimsbf |
| repeat_first_field | 1 | uimsbf |
| chroma_420_type | 1 | uimsbf |
| progressive_frame | 1 | uimsbf |
| composite_display_flag | 1 | uimsbf |
| if ( composite_display_flag ) { | | |
| v_axis | 1 | uimsbf |
| field_sequence | 3 | uimsbf |
| sub_carrier | 1 | uimsbf |
| burst_amplitude | 7 | uimsbf |
| sub_carrier_phase | 8 | uimsbf |
| } | | |
| mb_format | 1 | uimsbf |
| next_start_code() | | |
| } | | |

F I G. 1 4 A

| mb_format | Meaning |
|---|---|
| 0 | 2:2:2 |
| 1 | RECEIVING chroma_format OF SeqenceExtension |

F I G. 1 4 B

ENCODING/DECODING DEVICE, ENCODING/DECODING METHOD AND STORAGE MEDIUM

CROSS REFERENCE TO RELATED APPLICATIONS

This application claims priority from Japanese Patent Application No. JP2008-139739 filed on May 28, 2008, which is incorporated hereinto by reference.

BACKGROUND OF THE INVENTION

1. Field of the Invention

The present invention relates to the encoding/decoding technology of video data, and more particularly to a technology for reducing video signals in the pre-stage process of encoding.

2. Description of the Related Art

Since the amount of data of video data is overwhelmingly large compared with that of audio data or character data, in it process and data transfer, the compression/encoding of data is indispensable.

For this encoding, various methods are proposed.

For example, Patent document 1 (Japan Patent Application Laid-open No. 2007-53788) discloses a compressing/encoding method capable of calculating the degree of encoding difficulty of the pattern of each piece of image data and freely modifying the size of data after compression by appropriately compressing/encoding it with a compression ratio according to the calculated degree of difficulty.

Patent document 2 (Japan Patent Application Laid-open No. H10-164581) also discloses a technology for encoding image data in which image patterns are not uniform uniforming its image quality. In Patent document 2, calculate the degree of encoding difficulty and a weight co-efficient indicating the conspicuousness of image degradation for each macroblock (MB), calculating its degree of complexity on the basis of the encoding difficulty and the weight co-efficient and calculating the encoding quantization scale of each MB using the degree of complexity.

Furthermore, Patent document 3 (Japan Patent Application Laid-open No. H11-196437) discloses a motion detection method for detecting the motion of video signals between frames and between fields by a mixed signal obtained by adding its luminance and chrominance a certain ratio in order to improve the compression efficiency of image data.

Video data to be compressed is a 4:2:2 format signal in which a luminance (Y) has the number of pixels twice that of each chrominance (Cb, Cr, Pb, Pr or U, V) or a 4:4:4 format signal where the number of pixels of a luminance is the same as that of a chrominance are used. However, in most of the encoding of video encoding, video data is encoded after its format is converted to a 4:2:0 format signal or a 4:2:2 format signal in which the number of pixels of a chrominance is reduced by a sub-sample, for the reason that its total number is desired to reduce in the process in a pixel signal level in order to improve a compression ratio or that a luminance more easily recognizes its degradation from the viewpoint of a human visual characteristic.

Generally, an encoding method for reducing the number of processed pixels of a chrominance contributes to improve compression efficiency while maintain quality as much as possible.

FIG. 1 shows the simple concept of the video format.

A video is a group of a plurality of still images and consists of a plurality of frames. The frame memory of an encoding device stores a plurality of these frames.

In the case of a 4:2:2 format signal, when one piece of the still image frames is extracted, it is composed at the ratio of Y:Cb:Cr=4:2:2. As a specific example of this 4:2:2 format signal, there are ITU-R Rec. 709, ITU-R Rec. 656 or the like.

One piece of frame is composed of a plurality of MB and each MB is composed of four blocks of Y, one block of Cb and one block of Cr. One block is composed of 8×8 pixels.

Each still image of this 4:2:2 format signal is converted to a video format signal at the ratio of Y:Cb:Cr=4:1:1 called 4:2:0 format signal and is encoded. In this image encoding process, each still image is divided into sub-blocks called macroblock (MB) and is encoded for each MB. In this case, a video signal converted to a 4:2:0 format at the ratio of Y:Cb:Cr=4:1:1 is used.

FIGS. 2 and 3 show the configurations of the conventional encoding/decoding devices, respectively.

The encoding device 1a shown in FIG. 2 comprises a chrominance reduction/conversion unit 11, frame memory 12, a motion vector probe unit 13, a motion prediction unit 14, an orthogonal transform (T(DCT)) unit 15, a quantization (Q) unit 16, a variable length encoding (VLC) unit 17, an inverse quantization (IQ) unit 18, inverse orthogonal transform (IDCT) unit 19, an adder 20 and a subtractor 21.

The chrominance reduction/conversion unit 11 reduces the chrominance of an inputted video signal, for example, from a 4:2:2 format signal to a 4:2:0 format signal. The frame memory 12 mainly stores frame data in order to predict a motion and stores image data in the past and the future. The motion vector probe unit 13 reads an original image macroblock 22 and a reference block 23 from the frame memory 12 and calculates a motion vector being the amount of movement of the reference block 23 from the original image macroblock 22 on the basis of them. As the motion vector, the minimum predicted residual signal is selected on the basis of a certain criterion (absolute value sum or square-sum). The motion prediction unit 14 performs forward prediction, backward prediction and both-direction prediction on the basis of the reference frame in the frame memory 12 and the motion vector calculated by the motion vector probe unit 13 and generates a prediction frame.

The subtractor 15 subtracts the prediction frame calculated by the motion prediction unit 14 from the original image macroblock 22 and outputs the difference to the orthogonal transform unit 16. The orthogonal transform unit 16 applies a direct cosign transform (DCT) to a pixel whose motion is compensated for every 8×8 blocks. The quantization unit 17 quantizes a DCT transform co-efficient taking a visual characteristic into consideration. The variable length encoding unit 18 converts the quantization value to a variable length code, such as a Huffman code or the like, and outputs the code.

The inverse quantization unit 19 reversely converts the quantization value to the DCT transform co-efficient. The inverse orthogonal transform unit 20 reversely converts the DCT transform co-efficient calculated by the inverse quantization unit 18 to 8×8 blocks of pixel data. The adder 21 adds the prediction frame compensated for by the motion vector outputted from the motion prediction unit 14 to the pixel data of the differential value outputted from inverse orthogonal transform unit 20 and writes the pixel data to which distortion is added by compression into the memory frame 12 as a new reference frame.

In the encoding device 1a having such a configuration, when a video signal 11 is inputted, format conversion for reducing the chrominance of the video signal is applied to the video signal by the chrominance reduction/conversion unit and then is stored in the frame memory 12. Then, an image data compression process, such as MPEG or the like, is applied to the video signal and its code is outputted.

The video encoding device 1a, the enormous amount of information of an original signal is compressed by eliminating the redundancy in the time and spatial direction. More specifically, for the time direction, a motion compensation method for eliminating a difference with previous and subsequent frames using a motion vector is used and for the spatial direction, orthogonal transform for transforming the horizontal/vertical planes of a screen to frequency components, the representative value of orthogonal transform co-efficient obtained by quantization or the like is used. Data compression is also performed using a variable length encoding as an arithmetic information compression method.

In the conventional video encoding device 1a, compression efficiency has been improved by performing the resolution conversion of a chrominance using the chrominance reduction/conversion unit 11, for example, converting a 4:2:2 format input signal to a 4:2:0 format signal.

Next, a conventional decoding device 2a is described.

FIG. 3 shows a configuration example of the conventional decoding device 2a.

The decoding device 2a shown in FIG. 3 comprises a variable decoding (VLD) unit 31, an inverse quantization (IQ) unit 32, an inverse orthogonal transform (IDCT) unit 33, a motion compensation unit 34, an adder 35, frame memory 36 and a chrominance extension/conversion unit 37.

The variable decoding unit 31 converts the variable length code, such as a Huffman code or the like, to a quantum value. The inverse quantization unit 32 reversely converts a quantization value to a DCT transform co-efficient. The inverse orthogonal transform unit 33 reversely converts the DCT transform co-efficient calculated by the inverse quantization unit 32 to 8×8 blocks of pixel data. However, although in the case of an I picture, the pixel data calculated here is actual pixel data itself, in the case of a P or B picture, it is a differential value between two pieces of pixel data. The motion compensation unit 34 calculates a block compensated for by a motion vector used in the encoding device 1a. The adder 35 adds a differential value outputted from the inverse quantization unit 32 and the block compensated for by the motion vector outputted from the motion compensation unit 34 to calculate a P or B picture. The frame memory 36 stores the pixel data of the calculated frame. The chrominance extension/conversion unit 37 converts, for example, a 4:2:0 format signal whose chrominance is reduced by the encoding device 1a to a 4:2:2: format signal by compensating for the chrominance as a post-treatment.

In the conventional decoding device 2a, since the reverse of the encoding process of the encoding device 1a is performed, many of its components are the same as those included in the encoding device 1a. In the decoding device 2a, a differential value is calculated by the reverse of the encoding process of the encoding device 1a and in the motion compensation unit 34 it is decoded using a motion vector determined by the encoding device 1a. In the chrominance extension/conversion unit 37, an extension process is applied to the code to which the chrominance reduction/conversion is applied at the pre-stage of the encoding process to transmit it as a video signal.

However, in a video signal to encode/decode, a luminace is not always recognized more easily and depending on a scene, a chrominance sometimes is more characteristic than the luminance.

In such a scene, the degradation of a chrominance becomes conspicuous when encoded. Nevertheless, in a video encoding, when a 4:2:2 format signal is inputted, it is often converted to a 4:2:0 format signal.

Recently, in home appliances, such as an HDTV-compatible TV, movie and the like, a chrominance has been more richly expressed and color depth can be expressed in more detail. From such point of view too, it can be said that a pro-chrominance component process has been widely spread.

SUMMARY OF THE INVENTION

It is an object of the present invention to provide encoding/decoding devices, encoding/decoding methods and a storage medium realizing encoding in which this chrominance is more favored while the amount of process used to encode, that is, the number of blocks to process is maintained, against such a problem and the market trend.

This encoding device presumes compressing and encoding input video signals and in order to solve the above-described problem, it comprises a luminance complexity calculation unit, a chrominance complexity calculation unit, a reduction/conversion unit and an encoding unit.

The luminance complexity calculation unit calculates the complexity of a luminance in the input video signal.

The chrominance complexity calculation unit calculates the complexity of a chrominance in the input video signal.

The reduction/conversion unit converts the format of the input video signal on the basis of the complexity of the luminance and chrominance calculated by the luminance complexity calculation unit and the chrominance complexity calculation unit, respectively.

The encoding unit compresses/encodes the video signal to which format conversion is applied by the reduction/conversion unit to generate encoded data.

By this configuration, in this encoding device, a format is converted on the basis of the complexity of the luminance and chrominance in the input video signal.

This decoding device presumes decoding input encoded signals and comprises an image conversion specification unit, a decoding unit and an extension/conversion unit.

The image conversion specification unit calculates the type of format conversion performed when the video signal is encoded.

The decoding unit decodes the encoded signal on the basis of the type of format conversion from the image conversion specification unit.

The extension/conversion unit converts the format of the signal decoded by the decoding unit on the basis of the type of format conversion from the image conversion specification unit.

By this configuration, in this decoding device, an encoded signal whose format is converted by the encoding device can be decoded.

The present invention also includes the encoding method, decoding method and storage medium thereof in its scope.

BRIEF DESCRIPTION OF THE DRAWINGS

FIG. 2 shows the configuration of the conventional encoding device.

FIG. 4 shows a configuration example of the encoding device in this preferred embodiment.

FIG. 7 shows a structure example of a 2:2:2 format MB.

FIG. 12 shows an example of Sequence_extension information attached to each GOP of the bit stream encoded by the encoding device in this preferred embodiment.

FIGS. 13A and 13B show an example structure of choroma_extension information.

FIG. 14A shows an example of Picture coding_extension information.

FIG. 14B shows an example of mb_format information.

DESCRIPTION OF THE PREFERRED EMBODIMENT

Figure 1:
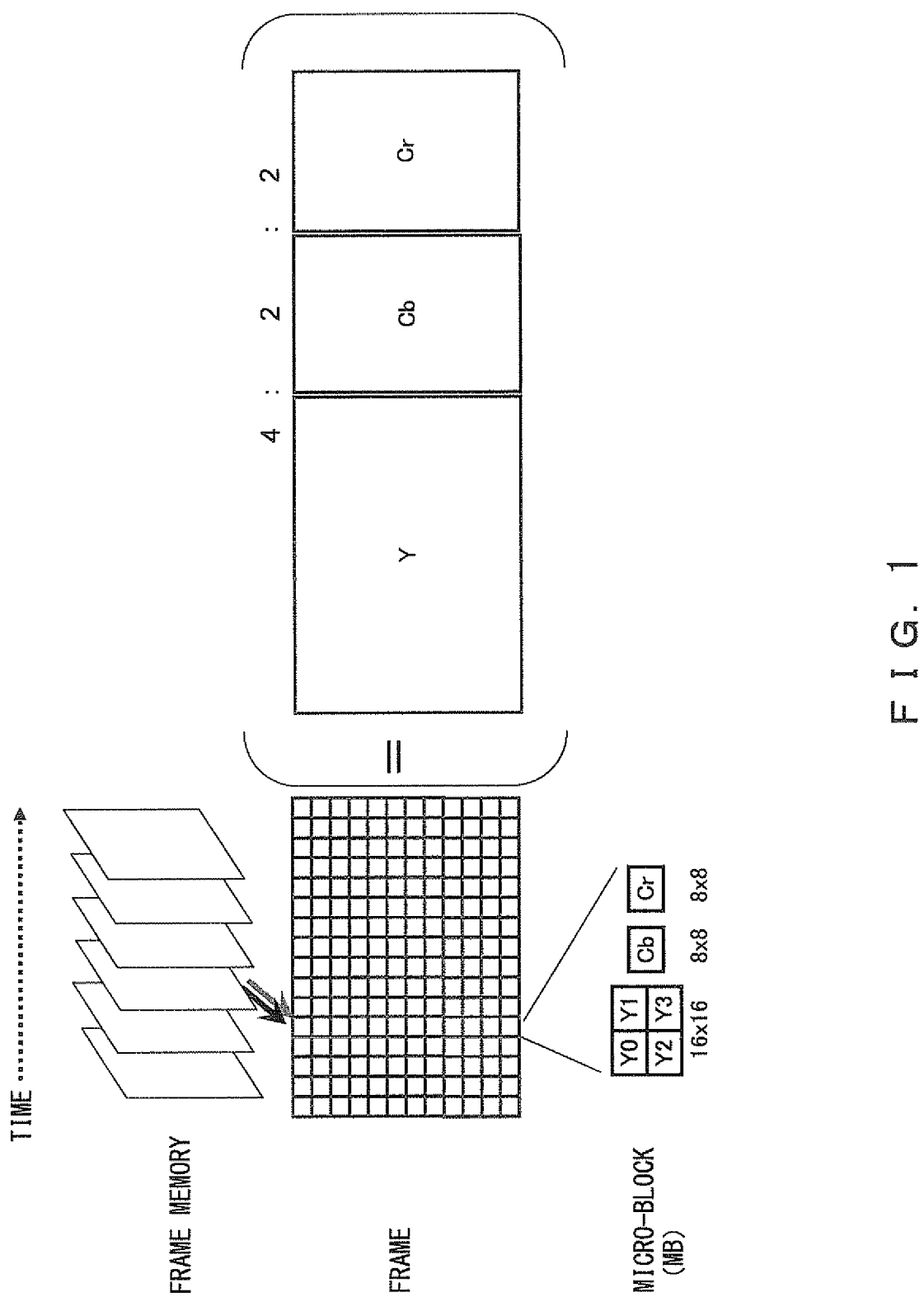
FIG. 1 shows the brief concept of a video format.

One preferred embodiment of the present invention is described below with reference to the drawings.

The encoding device in this preferred embodiment improves its coding process performance by adaptively modifying to which resolution conversion is applied, a luminance or a chrominance, on the basis of the complexity of an input video signal.

The decoding device in this preferred embodiment determines to which resolution conversion is applied, a luminance or a chrominance on the basis of information attached to an encoded signal or the like and decodes the encoded data.

For example, in the decoding device, a function to reduce/convert a luminance instead of a chrominance at the pre-stage of the decoding device and to maintain the resolution of a chrominance is added. A function to analyze the complexity of each of luminance/chrominance components of an input signal to encode and a function to determine which is reduced, a luminance component or a chrominance component on the basis of statistical information from the analysis unit is added.

In the decoding device, a function to determine which signal component is reduced, a chrominance component or a luminance component and to extend one of chrominance/luminance signals as the decoding process or the post-treatment of the decoding process is added. Information about which signal component is reduced, a chrominance or a luminance signal can be multiplexed in the bit stream of a signal to encode. Alternatively, the information can be tacitly determined by performing the same process in the encoding/decoding devices.

Thus, if a pro-luminance encoding is desired, a chrominance signal can be reduced as ever and if a pro-chrominance encoding is desired, a luminance can be reduced instead of a chrominance.

FIG. 4 shows a configuration example of the encoding device 1b in this preferred embodiment. In FIG. 1b, the same reference numerals are attached to the same components as those of the encoding 1a shown in FIG. 2.

When the encoding 1b shown in FIG. 4 is compared with the encoding 1a shown in FIG. 2, in the encoding 1b shown in FIG. 4, a luminance complexity calculation unit 41, a chrominance complexity calculation unit 42 and an encoding control unit 43 are newly provided and a reduction/conversion unit 44 is provided instead of the chrominance reduction/conversion unit 44.

The luminance complexity calculation unit 41 calculates the complexity of a luminance in an input video signal. The chrominance complexity calculation unit 42 calculates the complexity of a chrominance in an input video signal.

One example of the calculation equation about how to calculate this complexity is show below.

If it is assumed that an intra-picture pixel value and the number of intra-picture pixels are xi and N, an average intra-picture pixel value μ is expressed as follows.

$$\mu = \sum_{i=0}^{N-1} (xi/N)$$

In this case, if a squared differential error S from the average intra-picture pixel value μ is defined as follows, an intra-picture pixel distribution $\sigma^2$ and standard deviation σ can be calculated as follows.

$$S = \sum_{i=0}^{N-1} (xi - \mu)^2 \quad (1)$$
$$\sigma^2 = S/(N-1)$$
$$\sigma = \sqrt{S/(N-1)}$$

The luminance complexity calculation unit 41 calculates the distribution value σY of a luminance, using Equation (1) and inputs it to the encoding control unit 43. The chrominance complexity calculation unit 42 calculates the distribution values σCb and σCr of a chrominance, using Equation (1) and inputs them to the encoding control unit 43.

The encoding control unit 43 comprises a reduction determination unit 45, a picture format determination unit 46, an image reading unit 47, a prediction type determination unit 48 and a quantization determination unit 49.

The reduction determination unit 45 determines which is larger in an input video signal, the complexity of a luminance or the complexity of a chrominance, on the basis of the distribution values σY inputted from the luminance complexity calculation unit 41, σCb and σCr inputted from the chrominance complexity calculation unit 42. In order to prevent the determination result from frequently changing, instead of simply comparing σY with σCb+σCr, an offset α is added to the chrominance distribution value and σY is compared with σCb+σCr+α. The picture format determination unit 46 determines which of a video signal is reduced, a luminance or a chrominance, on the basis of the determination result of the reduction determination unit 45 and instructs the reduction conversion unit 44 to do so. The image reading unit 47 controls blocks read from the frame memory 12. The prediction type determination unit 48 controls an arithmetic calculators 15 and 25 on the basis of how to predict, such as performing in-frame prediction or inter-frame prediction, performing frame prediction even in inter-frame prediction or field prediction, and the like. The quantization determination unit 49 controls the quantization unit 17 about the roughness of quantization on the basis of a compression ratio.

The reduction conversion unit 44 converts an input video signal to a format signal in which a chrominance is reduced or to a format signal in which a luminance is reduced, according to the control instruction of the picture format determination unit 46.

In the encoding device 1b having such a configuration, when a video signal is inputted, the complexity of each of the luminance and chrominance components of the input video signal is calculated. If the complexity of the luminance is small, the luminance is reduced. If the complexity of the chrominance is small, the chrominance is reduced. Then, after this format conversion of the video signal is performed, the video signal is compressed and reduced.

Next, the operating process of the encoding device 1b in this preferred embodiment is described.

Firstly, for the purpose of comparison, the operating process of the conventional encoding device 1a is described.

Figure 5:
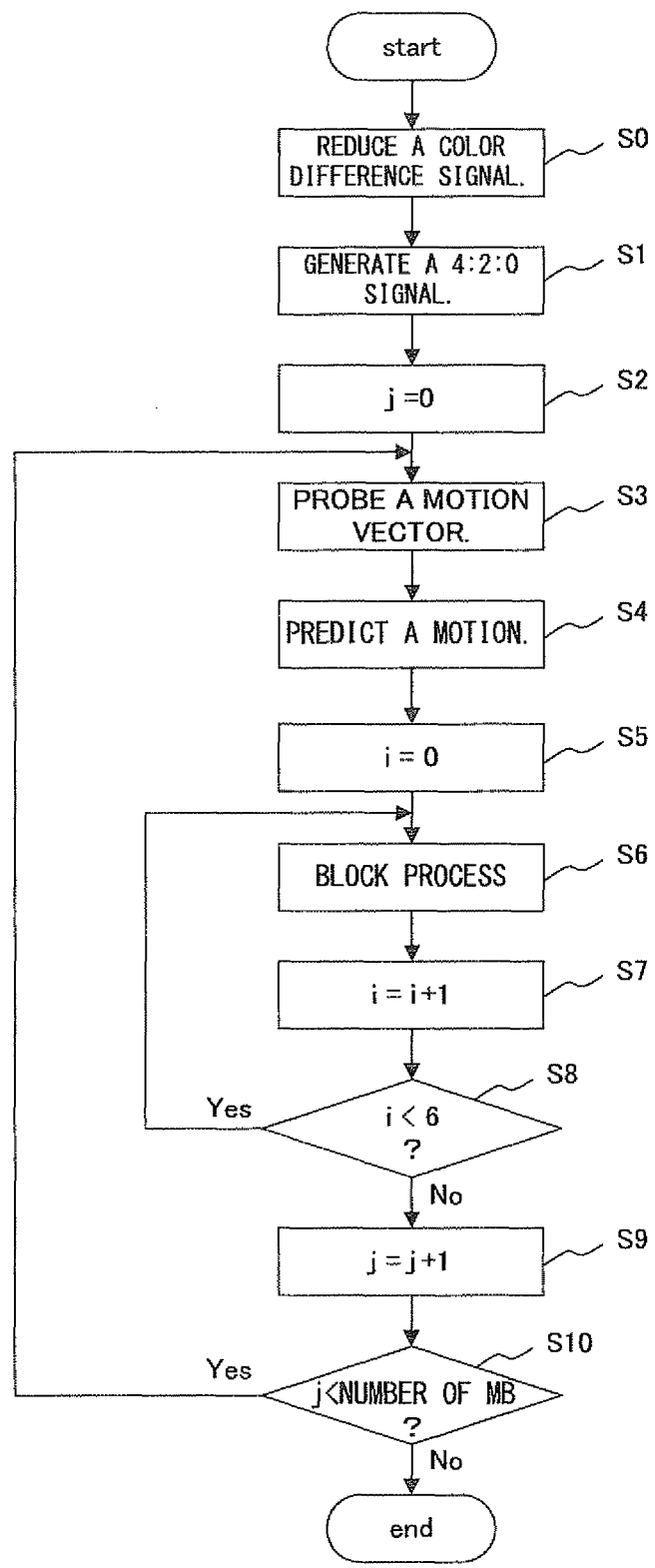
FIG. 5 is a flowchart showing the operation of the conventional encoding device at the time of encoding an input video signal.

FIG. 5 is a flowchart showing the operating process of the conventional encoding device 1a at the time of encoding an input video signal.

When the process shown in FIG. 5 is started, firstly, in step S0 the encoding device 1a reduces the chrominance component of a video signal by the chrominance reduction/conversion unit 11. Then, in step S1 the format signal in which a chrominance is reduced is converted, for example, to a 4:2:0 format signal and is stored in the frame memory 12.

Then, 0 is set in an MB counter value j (step S2). After that, the video signal in the memory frame 12 is encoded for each MB.

In this encoding process, firstly, an original image MB 22 and its reference block 23 are read and in step S3 a motion vector is probed for each MB by the motion vector probe unit 12. Then, in step S4, motion prediction is conducted by the motion prediction unit 14 using the motion vector probed in step S3.

Then, in step S5, 0 is set in the counter value i of the block. Then, in step S6, the block is processed using the result of the motion prediction in step S5. This block process includes orthogonal transform, quantization, variable length encoding, inverse quantization and inverse orthogonal transform. This block process also includes MB type determination by which it is determined in what mode an MB is encoded, and the like.

In the case of a 4:2:0 format signal, as shown in FIG. 1, one MB is composed of six blocks of Y0, Y1, Y2, Y3, Cb and Cr. In step S7, the block process is applied to all of these six blocks while incrementing the block counter value I (Yes in step S8). After the block process of all the blocks is completed (No in step S8), in step 9 the counter value j of the MB is incremented. If the counter value j has not reached the total number of the MB yet (Yes in step S10), the above-described processes in steps S4 through S10 are repeatedly applied. If the counter value j has reach the total number of the MB (No in step S10) and the process of all the MB is completed, the process is terminated.

Next, the operating process of the encoding device 1b in this preferred embodiment is described.

Figure 6:
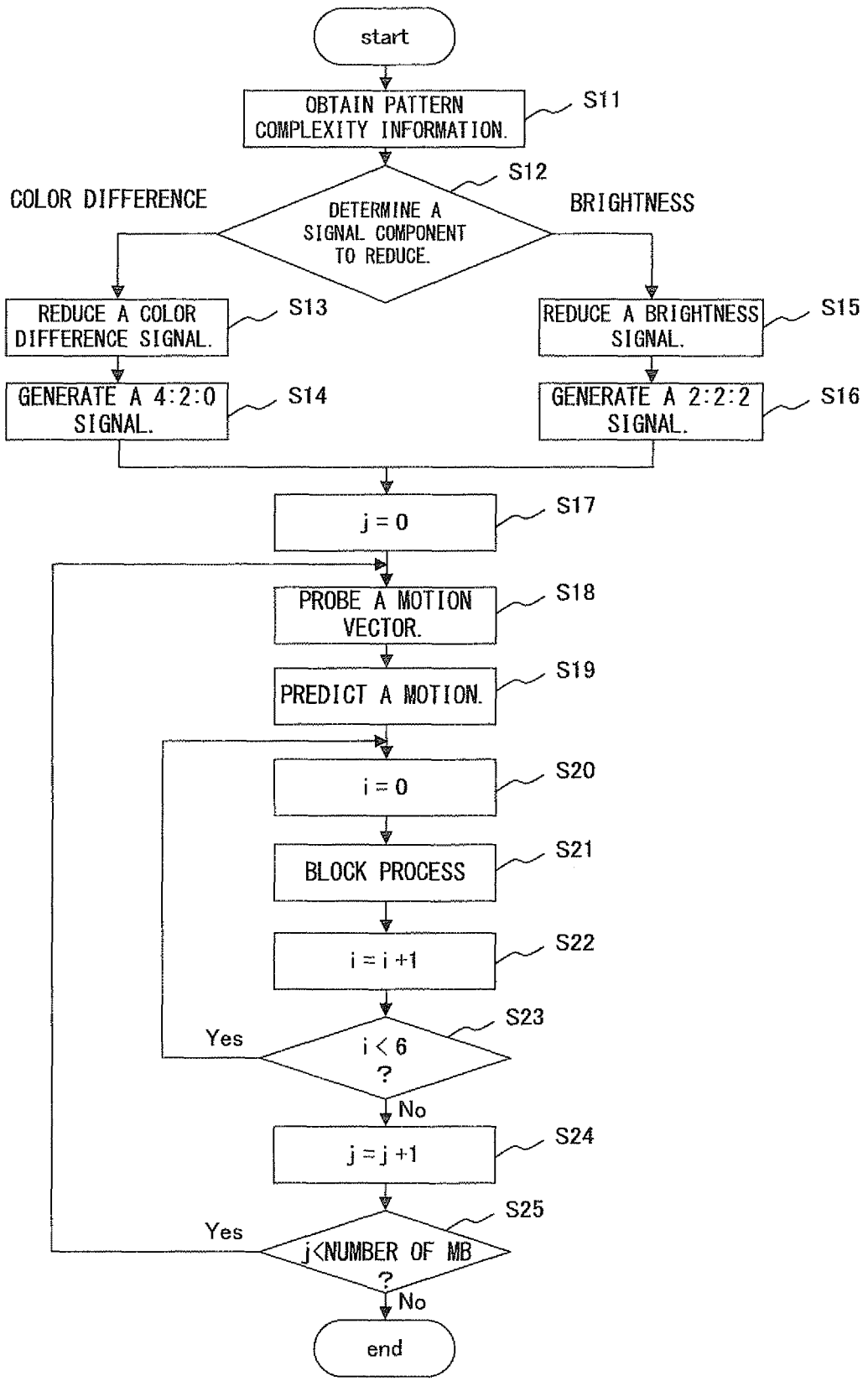
FIG. 6 is a flowchart showing the operation of the encoding device in this preferred embodiment at the time of encoding an input video signal.

FIG. 6 is a flowchart showing the operation of the encoding device in this preferred embodiment at the time of encoding an input video signal.

The process shown in FIG. 6 comprises a process for determining the information of which is reduced/converted, a luminance or a chrominance when compared with that shown in FIG. 5.

When the process shown in FIG. 6 is started, firstly, in step S11, distribution values σY, and σCb and σCr indicating the complexity of the luminance and chrominance components, respectively, of an input video signal are calculated using Equation (1).

Then, in step S12, the distribution value σY of the luminance and the distribution values σCb and σCr of the chrominance that are calculated in step S11 are compared by the reduction determination unit 45 of the encoding control unit 43 and it is determined, the reduction of which is less influential, a luminance or a chrominance, specifically which is smaller, the distribution value σY of the luminance or the distribution values σCb and σCr of the chrominance. As a result if it is determined that the chrominance should be reduced (chrominance in step S12), in step S13 the picture format determination unit 46 reduces the chrominance of the video signal and generates a 4:2:0 format signal (step S14).

If in step S12 it is determined that the luminance should be reduced (luminance in step S12), in step S15 the picture format determination unit 46 reduces the luminance of the video signal and generates format signal in which the luminance has been reduced (step S16). In the following description, this format signal in which the luminance is reduced is called a 2:2:2 format signal. This 2:2:2 format signal newly defined did not exist in the present video signal.

FIG. 7 shows an example of the 2:2:2 format MB.

As shown in FIG. 7, in a 2:2:2 format MB, the luminance has only two blocks Y0 and Y1 of and the number is half of the original 4:2:2 format signal. The chrominance has four blocks of Cb0, Cb1, Cr0 and Cr1 and the number is the same as the original 4:2:2 format signal.

Since in this 2:2:2 format signal, a chrominance is left as it is and only a luminance is reduced, the influence of the reduction of the amount of information is small even when the format is used for an image greatly influenced by a chrominanc signal.

Figure 16:
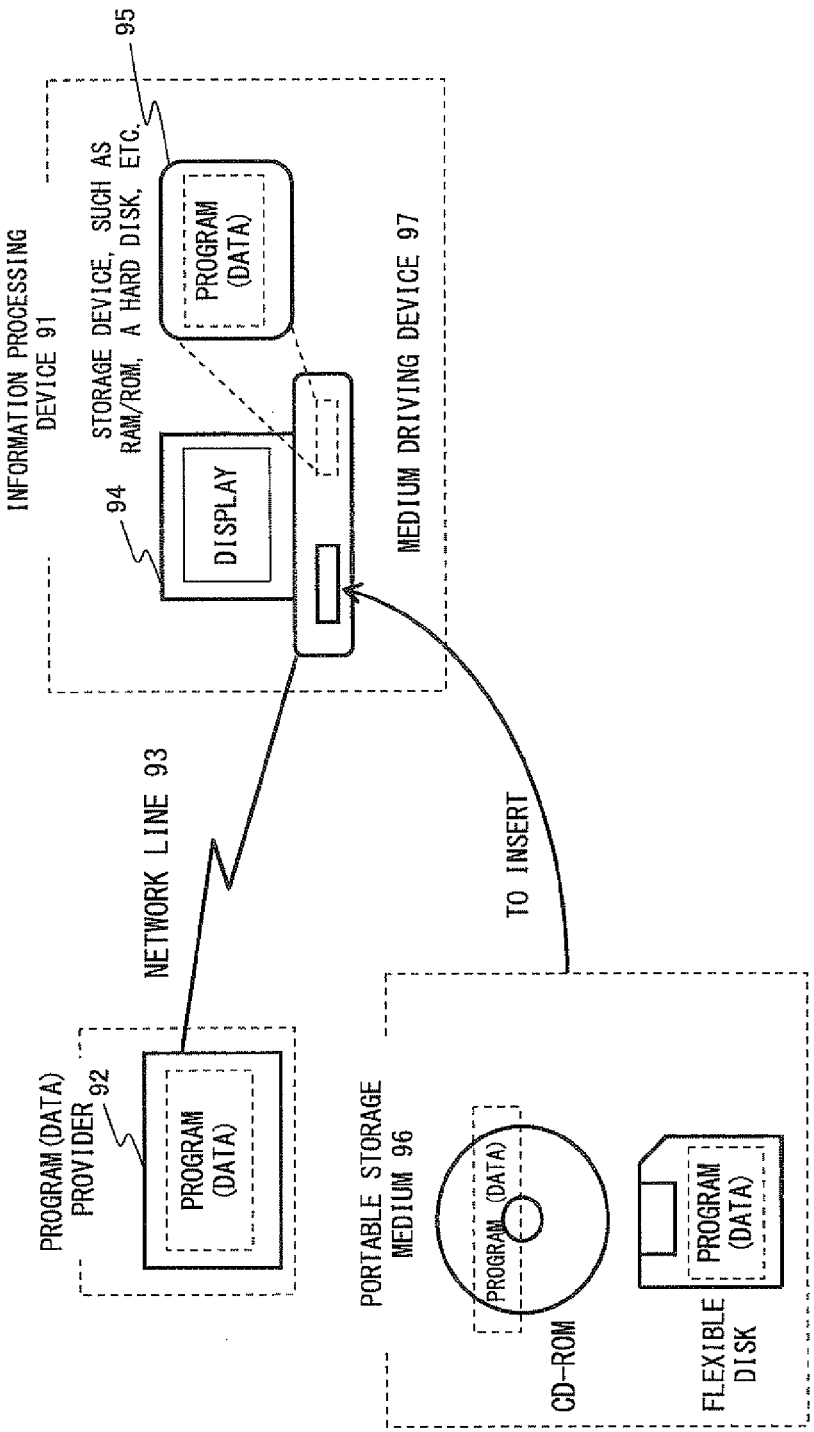
FIG. 16 shows examples of the storage medium.

When a 4:2:0 format signal is generated in step S14, the processes in step S17 and after shown in FIG. 16 are the same as those in step S3 and after shown in FIG. 5.

Even when a 2:2:2 format signal is generated in step S16, the encoding process is performed for each MB.

As shown in FIG. 7, each MB of a 2:2:2 format signal is composed of six blocks of Y0, Y1, Cb0, Cb1, Cr0 and Cr1, and motion vector probe (step S18) and motion prediction by a motion vector obtained by the motion probe (step S19) are applied to these six blocks for each MB. Then, the block process (step S21) is applied to each block of the MB. These processes are almost the same as those in steps S2 through S10 shown in FIG. 5.

As described above, in the encoding device 1b in this preferred embodiment, at the pre-stage of the compression process, the complexity of the luminance and chrominance components of an input video signal can be calculated and information having less influence can be reduced.

Therefore, while the conventional encoding device always thins out only the chrominance component of an input video signal and applies encoding to it, when it is determined that the chrominance component greatly affects an image, the encoding device in this preferred embodiment can concisely improve the encoding efficiency of a scene in which encoding degradation is conspicuous in the chrominance component by providing a mechanism for thinning out a luminance component instead of the chrominance component.

Although in the above example, either a luminance component or a chrominance component is thinned out, the encoding device 1b in this preferred embodiment is not limited to only this. When only a Cr signal component (red chrominance component) is particularly desired to emphasize of the entire chrominance and so on, alternatively, encoding can be performed while maintaining the number of process blocks by modifying a reduction/extension ratio for each signal component, for example, reducing Y to ½ in each of the horizontal/vertical directions, reducing Cb to ½ in the vertical direction in such a way as to convert it to a 1:1:4 signal format and extending Cr to double or so on.

Next, the decoding device in this preferred embodiment is described.

Figure 8:
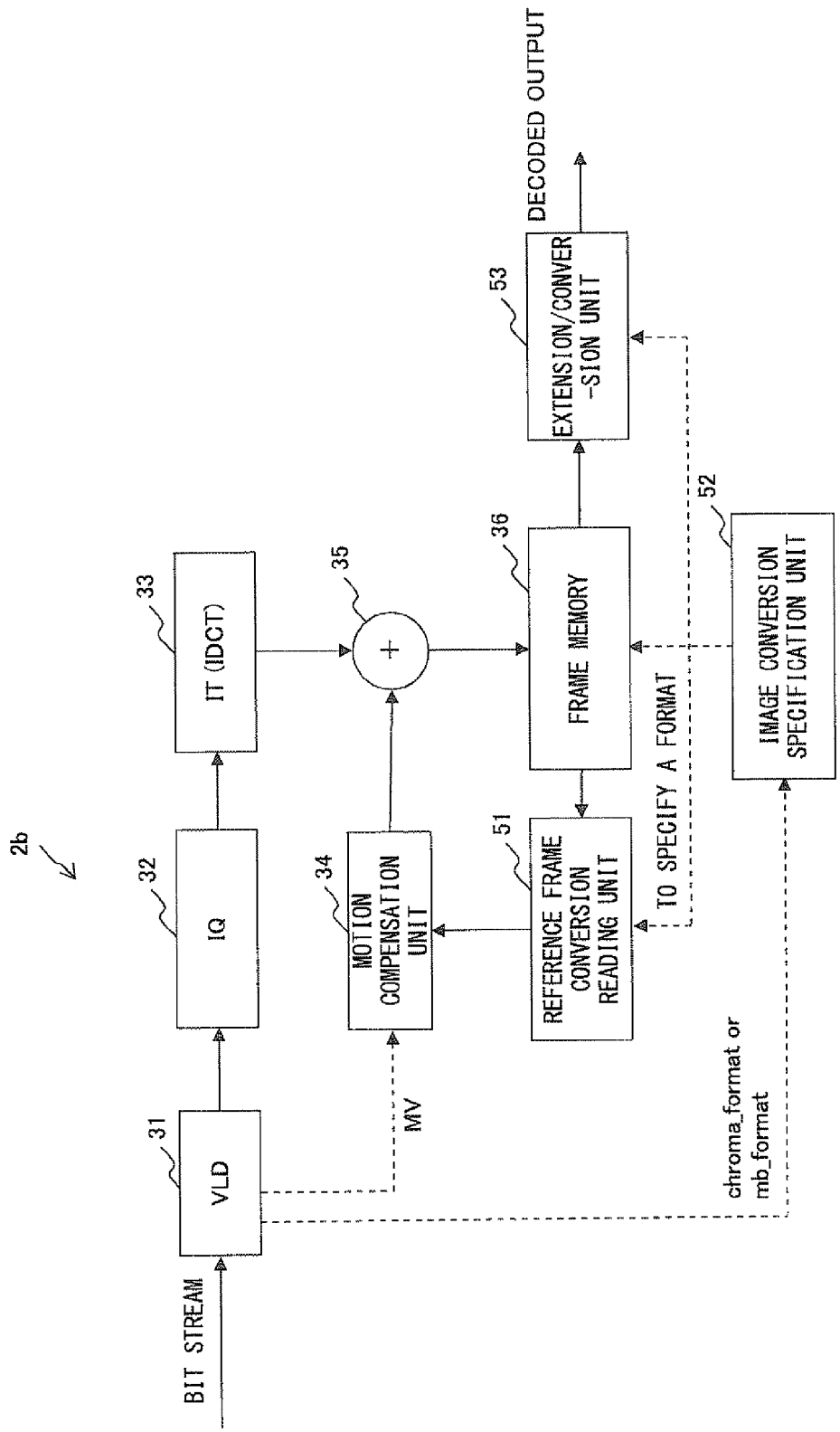
FIG. 8 shows a configuration example of the decoding device in this preferred embodiment.

FIG. 8 shows a configuration example of the decoding device 2b in this preferred embodiment. In FIG. 8, the same reference numerals are attached to the same components as in the conventional decoding device 2a of FIG. 3.

Figure 3:
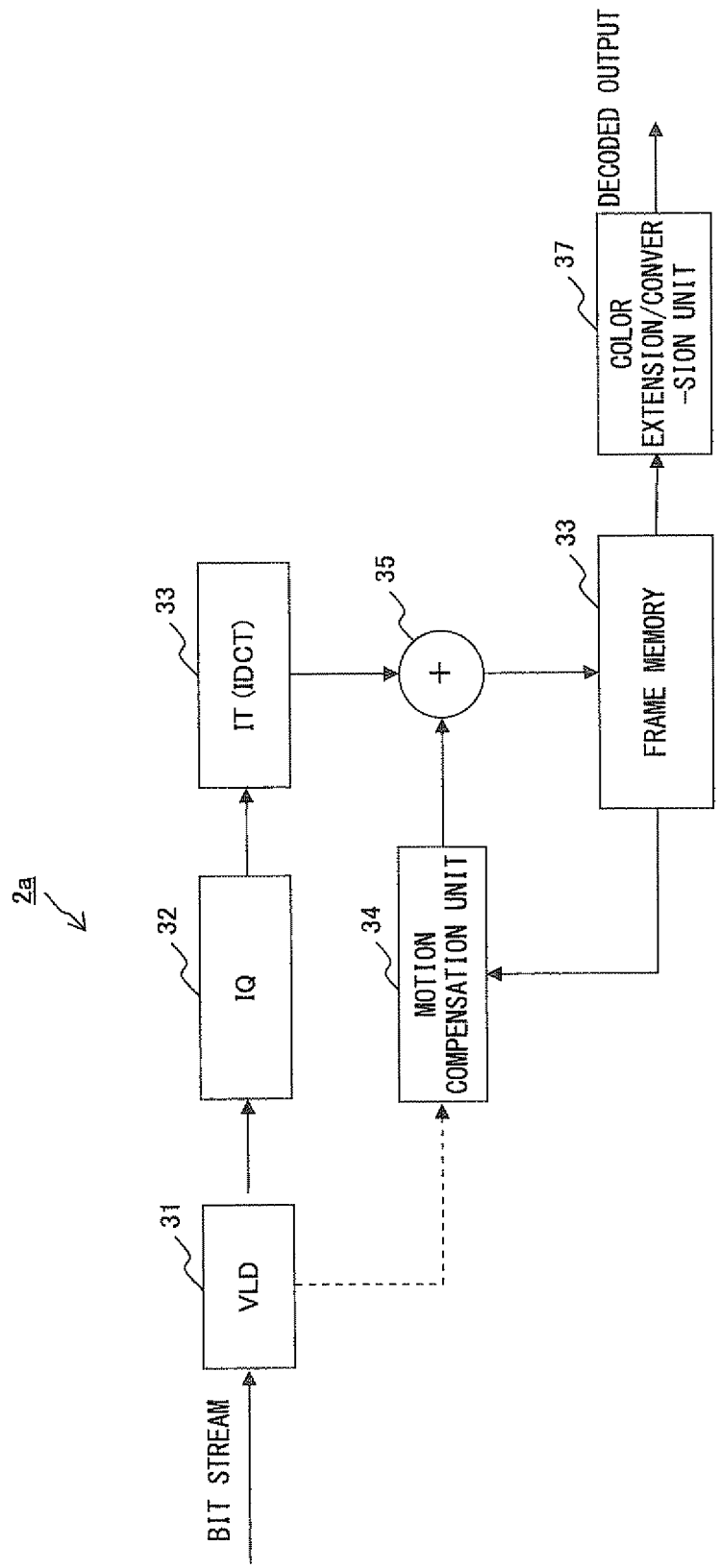
FIG. 3 shows the configuration of the conventional decoding device.

When the decoding device 2b shown in FIG. 8 is compared with the decoding device 2a shown in FIG. 3, in the decoding device 2b, a reference frame conversion reading unit 51 and an image conversion specification unit 52 are newly provided and a conversion unit 53 is provided instead of the chrominance extension/conversion unit 37.

The reference frame conversion reading unit 51 converts the format of the reference frame of the motion compensation unit 34 to the same format as the encoding format of a decoded picture on the basis of the notice on a signal format from the image conversion specification unit 52 and controls the motion compensation unit 34 to perform a motion compensation process.

The image conversion specification unit 52 extracts choroma_format or mb_format described later that is multiplexed in an inputted bit stream, stores encoding format information for several minutes of picture to be stored in the frame memory 36 and notifies the reference frame conversion reading unit 51, the frame memory 36 and the extension conversion-unit 37 of these from time to time.

In the decoding device 2b having such a configuration, when a bit stream to decode is inputted, the variable length code is converted to a quantization value, then a differential value is obtained by applying inverse quantization and inverse transform to it. The motion compensation unit 34 decode it using the motion vectors (MV) multiplexed in the bit stream. In this case, the motion assurance unit 34 calculates a reference frame on the basis of formant specification from the image conversion specification unit 52. The conversion unit 53 performs an extension process to restore the format conversion performed at the pre-stage of the encoding process on the basis of format specification from the image conversion specification unit 52 and transmits it as a video signal.

Thus, the bit stream whose chrominance or luminance component is reduced/encoded by the encoding device 1b in this preferred embodiment can also be decoded by the decoding device 2b.

Next, the operating process of the decoding device 2b in this preferred embodiment is described.

Firstly, for the purpose of comparison, the operating process of the conventional decoding device 2a is described.

Figure 9:
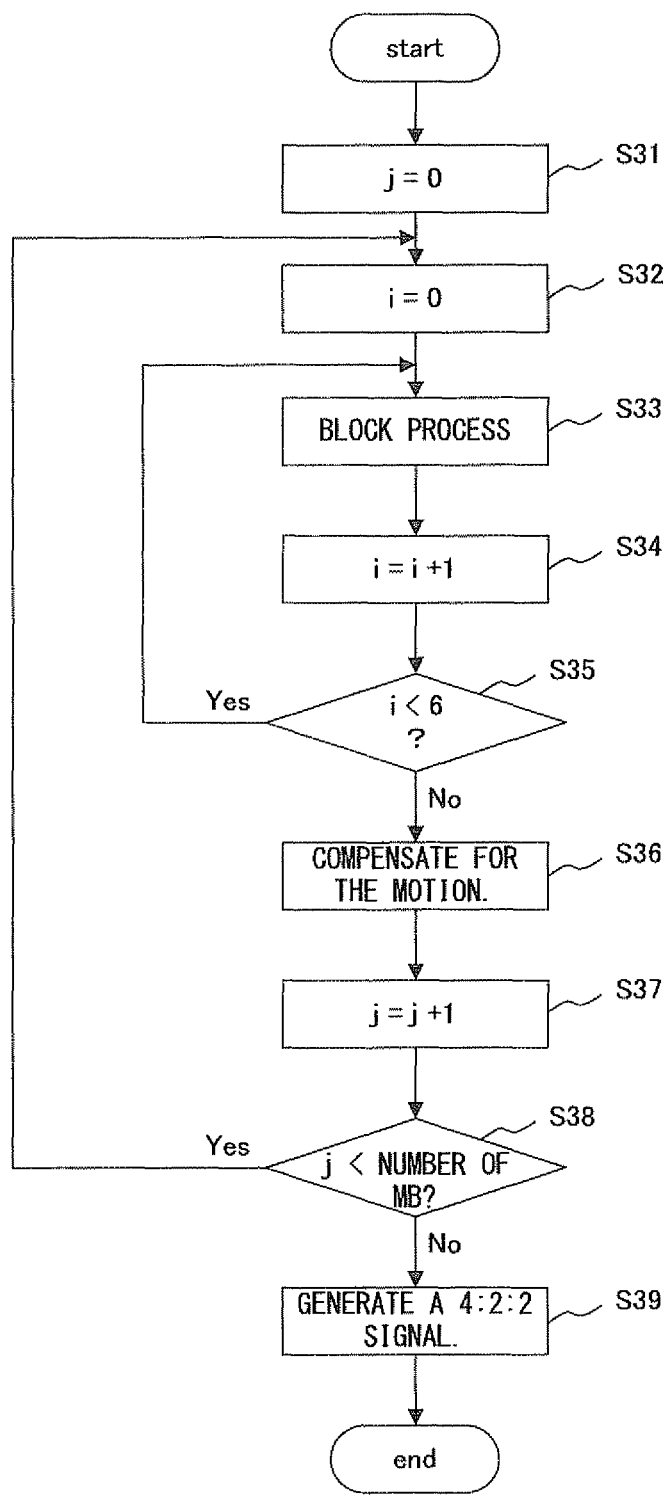
FIG. 9 is a flowchart showing the operation process of the conventional decoding device at the time of encoding an input video signal.

FIG. 9 is a flowchart showing the operation process of the conventional decoding device 2a.

When the process is started in FIG. 9, firstly, in step S31, 0 is set in the counter value j of an MB to clear it.

Then, in step S33, the counter value i of a block is incremented and a block process is applied to a block corresponding to the counter value i. In this block process, a bit stream being a variable length code is converted to a quantization value, and conversion, inverse quantization and inverse transform processes are applied to it. Then, the process in step S33 is applied to data for one MB (Yes in step S35) while incrementing the counter value i of the block (step S34).

Then, after the block process for one MB is completed (No in step S35), the motion compensation unit 34 performs motion compensation for each MB (step S36).

Then, the processes in steps S32 through S38 are performed while incrementing the counter value j of the MB step S37). After the process of all the MB is completed (No in step S38), in step S39, the chrominance component is extended and a 4:2:2 format signal is generated. Then, the process is terminated.

As described above, in the conventional decoding device 2a, finally the generated 4:2:0 format video signal is converted to a 4:2:2 format signal.

Next, the operating process of the decoding device 2b in this preferred embodiment is described.

Figure 10:
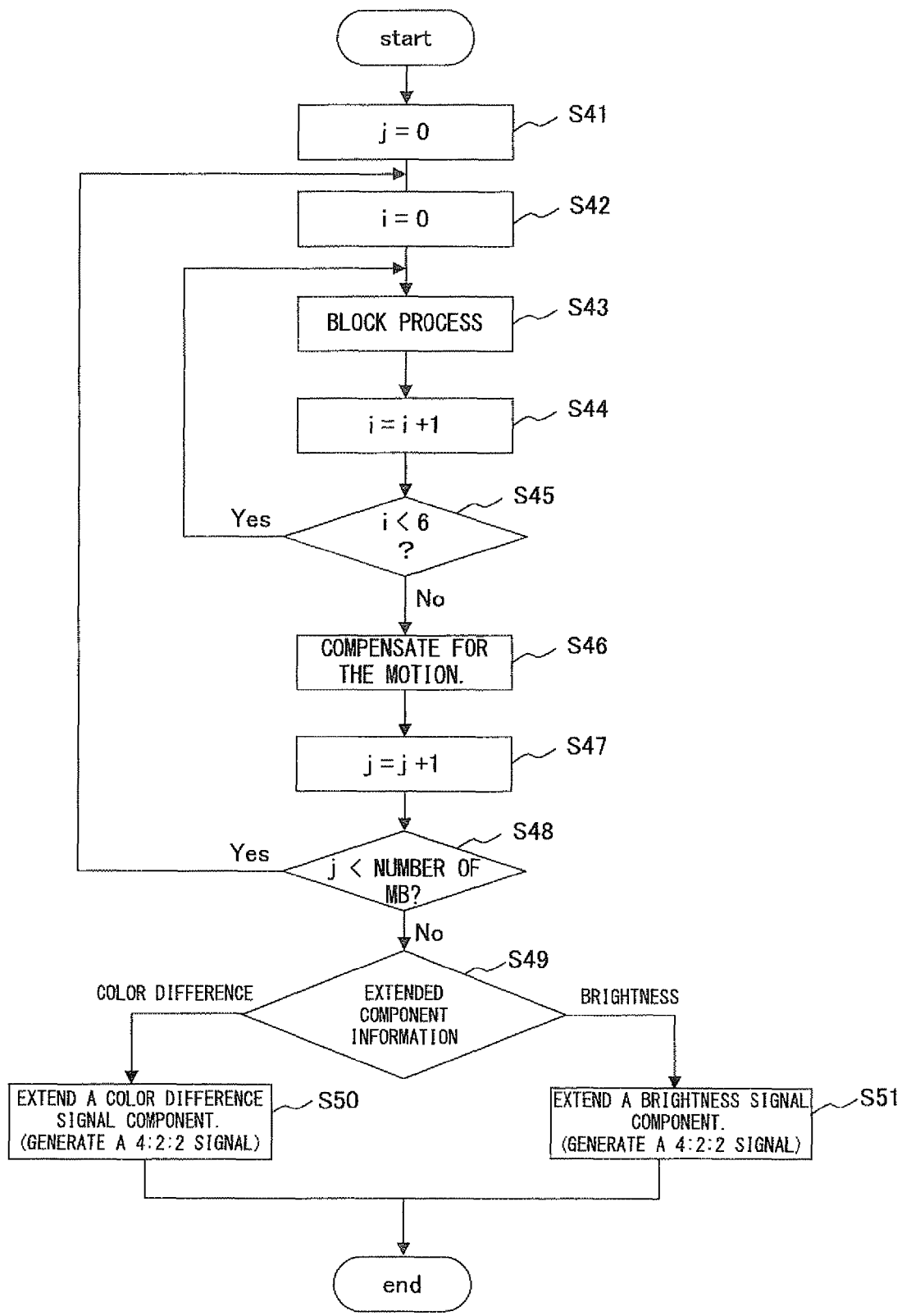
FIG. 10 is a flowchart showing the operation process of the decoding device in this preferred embodiment.

FIG. 10 is a flowchart showing the operation process of the decoding device 2b in this preferred embodiment.

Although in the decoding device 2b in this preferred embodiment, up to the part of the process in which one piece of picture is generated by decoding is the same as in the conventional device, the decoding device 2b differs from the conventional device in that a signal component to be extended in the post-treatment of decoding adaptively differs.

More specifically, its processes in steps S41 through S48 shown in FIG. 10 until motion compensation is performed for each MB after a block process is performed for each block in step S43 is basically the same as the processes in steps S1 through S8 of the conventional decoding device 2a shown in FIG. 9 except for that since a reference frame varies depending on a signal format, the reference frame must be reported to the motion compensation unit 34.

In the decoding device 2b in this preferred embodiment, as to the processes in step S48 and after, in step S49, the extension conversion unit 53 recognizes the format of a signal decoded in up to step S48 on the basis of chroma_format or mb_format multiplexed in the bit stream and determines by reducing which the format has been obtained, a chrominance signal component or a luminance component.

If in step S49 it is determined that a chrominance component has been reduced (chrominance in step S50), in step S50 the chrominance component is extended and a 4:2:2 format signal is generated/outputted. Then, the process is terminated. If in step S49 it is determined that a luminance component has been reduced (luminance in step S50), in step S51 the luminance component is extended and a 4:2:2 format signal is generated/outputted. Then, the process is terminated.

It can also be determined which the extension/conversion unit 53 extends, a chrominance component or a luminance component by superimposing/transmitting information indicating the type of format (chroma_format or mb_format) on encoding information as one component of a picture header as in the above example. Alternatively, by setting the information in the decoding device 2b in advance as the statistical information and performing the same calculation on both the encoding and decoding sides, it can be tacitly determined which the extension/conversion unit 53 extends, a chrominance component or a luminance component, without attaching the information.

Next, the modification unit of the type of a format is described.

It is well known that there are three types of an I picture (intra-picture), a P picture (predictive picture) and a B picture (bi-directionally predictive picture) in a picture constituting a compressed video (=1 field or 1 frame).

I picture is a reference picture, to which only spatial compression is applied and time compression is not applied, and its compression ratio is low. To P picture, besides spatial compression, time compression which takes in prediction only in the time axis forward direction and is based on a difference with the I picture is also applied. To B picture, besides spatial compression, bidirectional predicative compression using differences with previous and subsequent frames is applied. Therefore, the compression ratio of B picture is higher than that of P picture.

In a compression code, these pictures are not independent and compression/extension is performed for each group of a plurality of pictures called GOP (group of pictures) being the minimum component unit of a video.

In the encoding device 1b in this preferred embodiment too, encoding is performed for each GOP and the switch of a signal format at the pre-stage of encoding is also performed for each GOP.

Figure 11:
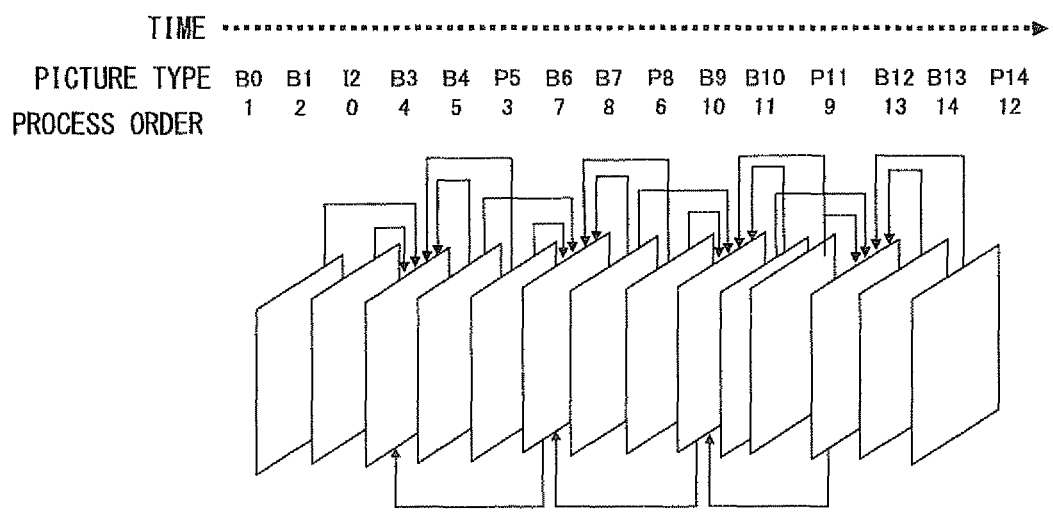
FIG. 11 shows the structure of the group of pictures.

FIG. 11 shows the structure of the group of pictures.

FIG. 11 shows an example of GOP in which two pieces of B picture continue after one piece of I or P picture to refer.

By restricting in such a way as to reduce a chrominance component or a luminance component for each GOP by switching a signal format, in both the encoding device 1b and the decoding device 2b, motion prediction and compensation can be performed by the same resolution and their configurations become easy.

In FIG. 11, B0 and B1 pictures refer to an I2 picture, B3 and B4 pictures refer to I2 and P5 pictures, a P5 picture refers to I2 picture, B6 and B7 pictures refer to P5 and P8 pictures, a P8 picture refer to a P5 picture, B9 and B10 pictures refer to P8 and P11 pictures, a P11 picture refers to a P8 picture, B12 and B13 pictures refer to P11 and P14 pictures and a P14 picture refers to a P11 picture.

Therefore, since a picture to be referenced must be processed in advance, in FIG. 11 a picture is processed in the order of I2, B0, B1, P5, B3, B4, P8, B6, B7, P11, B9, B10, P14, B12 and B13.

Alternatively, a signal format can be switched for each picture instead of for each GOP.

In this preferred embodiment, the minimum unit for actually storing it in the frame memory becomes a picture (=1 filed or 1 frame). Therefore, when the switch is performed for each picture, finer control becomes possible.

In this configuration, since there is a possibility that a motion predicative original image and the reference image may differ in resolution, it must be taken into consideration.

When the type of a format is modified for each picture, the target picture whose luminance component is reduced is only B picture being non-reference picture. I and P pictures are converted to 4:2:0 format signals.

Thus, even when a signal component whose resolution is modified is switched for each picture, influence due to a difference between an original image and the reference image can be reduced.

Since B picture that is not referenced for motion prediction spreads no encoding noise in the time direction even when its accuracy is reduced, accuracy-deteriorated encoding can be applied to B picture, for example, by a method of replacing it with the simple conversion of a motion vector or the like.

Furthermore, when switching a format for each picture in another preferred embodiment, in order to eliminate the influence of the difference in resolution between an original image and the reference image, in an arbitrary picture to encode resolution can be also matched between a chrominance component and a luminance component and also between an original image and the reference image.

In this configuration, it can be realized by attaching information indicating the format of each picture, such as which is reduced, a chrominance component and a luminance component or the like, is attached to each picture as the header information of each picture and storing the information at the time of the encoding process.

More particularly, in the case of B picture, even when the signal component to reduce of each of an original image, a forward reference image and a backward reference image differs, for example, by modifying the resolution of the entire picture to the resolution of the current picture to encode, reading it and encoding it by the resolution, encoding can be performed at less accuracy loss.

FIG. 12 shows an example of Sequence_extension information attached to each GOP of the bit stream encoded by the encoding device in this preferred embodiment.

The Sequence_extension information includes chroma_format information 61 and this chroma_format information 61 stores information indicating the format of a picture in the corresponding GOP.

FIG. 13 shows an example structure of choroma_extension information 61.

FIG. 13A shows the structure in which the choroma_extension information 61 is made two bits and which shows that if the choroma_extension information 61 is "00", the format of the picture of the corresponding GOP is 2:2:2 and if it is "01", the format of the picture of the corresponding GOP is 4:2:0.

FIG. 13B shows the structure in which the choroma_extension information 61 is made two bits in order to prevent it from being recognized to be START CODE when "0" continues.

FIG. 13B shows that when the choroma_extension information 61 is "100", the format of the picture of the corresponding GOP is 2:2:2 and when it is "001", the format of the picture of its corresponding GOP is 4:2:0.

When a signal format is switched for each GOP at the pre-stage of encoding, in the decoding device 2b, the format of the encoded bit stream can be known by referring to this chroma_format information 61.

FIG. 14A shows an example of Picture coding_extension information attached to each piece of the bit stream encoded by the encoding device in this preferred embodiment.

mb_format information 71 is newly attached to the Picture coding_extension information and this mb_format information 71 includes information indicating the format of its corresponding picture.

FIG. 14B shows an example of the mb_format information 71.

In FIG. 14B, the mb_format information 71 is one bit and FIG. 14B shows that if this bit is "1", the format of its corresponding picture is converted to 2:2:2. If this bit is "0", the format of its corresponding picture is determined on the basis of the chroma_format information 61 in the Sequencw_extension information shown in FIG. 13.

When a signal format is switched for each picture at the pre-stage of encoding, in the decoding device 2b, the format of the encoded bit stream can be known by referring to this mb_format information 71.

The encoding device 1b and decoding device 2b in this preferred embodiment is configured not only by the hardware shown in FIGS. 4 and 8, it can be also realized by software by executing a program in an information processing device.

Figure 15:
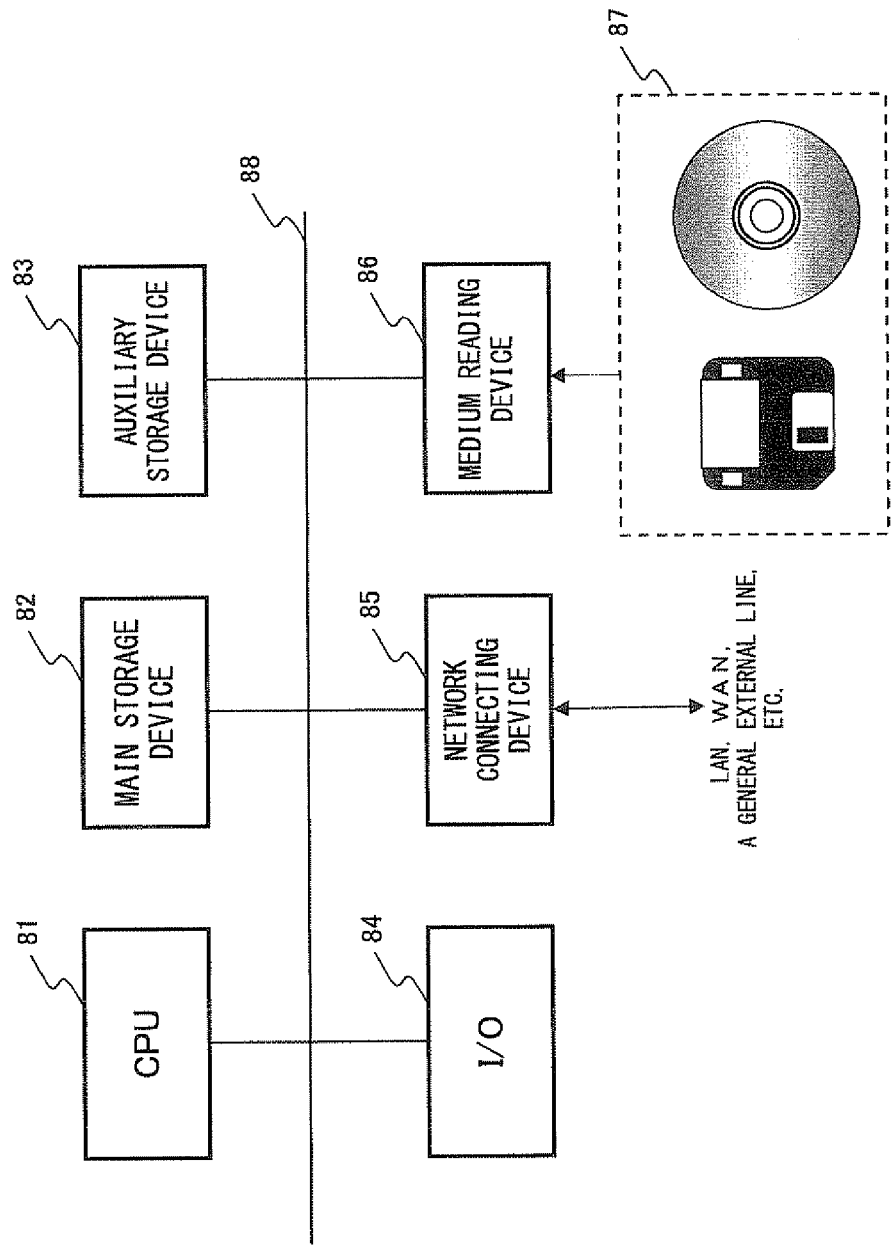
FIG. 15 shows the system environment of an information processing device by which the encoding/decoding devices in this preferred embodiment are realized.

FIG. 15 shows the system environment of an information processing device by which the encoding device 1b and decoding device 2b in this preferred embodiment are realized.

The information processing device shown in FIG. 15 comprises a CPU 81, a main storage device 82, such as RAM or the like, an auxiliary storage device 83, such as a hard disk or the like, an input/output device (I/O) 84, such as a display, a keyboard, a pointing device and the like, a network connecting device 85, such as a communication interface, a modem or the like, and a medium reading device for reading stored contents from a portable storage medium, such as a disk, a magnetic tape or the like, which are connected to each other by a bus 88. The components exchange data with each other via the bus 88.

The CPU 81 realizes the function of each component of the encoding device 1b and decoding device 2b shown in FIGS. 4 and 9 and the processes of the flowcharts shown in FIGS. 6 and 10 by executing a program in the auxiliary storage device 83 and a program installed via the network connecting device 85 using the main storage device as working memory.

In the information processing device shown in FIG. 15, the medium reading device 86 reads a program and data stored in a storage medium 87, such as a magnetic tape, a flexible disk, CR-ROM, an MO, a DVD or the like, and loads them onto the information processing device in this preferred embodiment via an external interface. Then, the program and data are stored in the main storage device 82 and the auxiliary storage device 83 and by executing the program using the data by the CPU 81, the processes of the above-described flowcharts are realized by software.

In the information processing device shown in FIG. 15, application software is sometimes exchanged using the storage medium 87, such as CD-ROM or the like. Therefore, the present invention is not limited to an encoding device, a decoding device, an encoding method, a decoding method and a program and when being used by a computer, it can be also constituted as a computer-readable storage medium 87 or program for enabling the computer to implement the above-described function in this preferred embodiment of the present invention.

In this case, as shown in FIG. 16, the "storage medium" includes a portable storage medium 96 detachable/attachable from/to a medium driving device 97, such as CD-ROM, a flexible disk (or an MO, a DVD, a memory card, a removable disk, etc.), a storage unit (a database, etc.) 92 in an external device (a server, etc.) connected via a network line 93 and memory (RAM, a hard disk, etc.) 95 in the main body 94 of an information processing device 91 and the like. The program stored in the portable storage medium 96 and the storage unit (a database, etc.) 92 is loaded onto the memory (RAM, a hard disk, etc.) 95 and is executed.

For the above-described storage medium, such as CD-ROM, DVD-ROM or the like, besides the above-described as examples, a next-generation optical disk storage medium using blue laser, such as a Blu-ray Disc (trademark), An AOD (advanced optical disc) or the like, an HD-DVD9 using red laser, a blue-laser DVD using blue/purple laser, a hologram and the like are used. The present invention can be also implemented using such various large-capacity storage medium developed in the future.

As described above, according to the encoding device in this preferred embodiment, since when converting a format by thinning out the luminance or chrominance component of an input video signal and converting its resolution, the complexity of the luminance and chrominance components and the format is converted on the basis of the complexity, the encoding efficient of a scene in which the encoding degradation of a chrominance component is conspicuous can be more concisely improved.

Although in the above examples, either a luminance component or a chrominance component is thinned out, if of the entire chrominance component, more particularly only a Cr signal component (red chrominance component) is desired to emphasize and so on, encoding can be performed while maintain the number of process blocks constant by modifying a compression/extension ratio for each signal component, for example, by reducing Y to ½ in each of the horizontal/vertical directions, reducing Cb to ½ in the vertical direction and extending Cr to double in a signal of Y:Cb:Cr=4:2:2, as in a 1:1:4 signal or the like.

The number of blocks of data encoded by the encoding device 1b in this preferred embodiment is the same in the case of a 4:2:0 format and in the case of a 2:2:2 format, and their amount of process is also the same.

According to the decoding device 2b in this preferred embodiment, signals encoded by the encoding device 1b can be decoded.

What is claimed is:

1. An encoding device for compressing and encoding an input video signal, comprising:
   a luminance complexity calculation unit to calculate complexity of a luminance component in the input video signal;
   a chrominance complexity calculation unit to calculate complexity of a chrominance component in the input video signal;
   a conversion unit to convert an input format of the luminance component and the chrominance component using the complexity of the luminance component and the complexity of the chrominance component; and
   an encoding unit to compress and encode the converted video signal,
   wherein the conversion unit maintains a total number of pixels in the input video signal including pixels with chrominance components and luminance components after converting from the input format.

2. The encoding device according to claim 1, wherein the number of blocks of the format in which a luminance component is reduced is the same as the number of blocks of the format in which a chrominance component is reduced.

3. The encoding device according to claim 1, wherein the format in which a luminance component is reduced is a format in which only resolution of the luminance component is reduced to half and the format in which a chrominance component is reduced is a 4:2:0 format.

4. The encoding device according to claim 1, wherein the conversion unit switches the format for each GOP (group of pictures) of the input video signal.

5. The encoding device according to claim 1, wherein the conversion unit switches the format for each picture of the input video signal.

6. The encoding device according to claim 1, wherein the conversion unit applies the switch of a format based on complexity only to B picture.

7. The encoding device according to claim 1, wherein the conversion unit converts a format in such a way that a format of a reference source frame and a format of a reference destination of the input video signal may become the same.

8. The encoding device according to claim 1, wherein if it is assumed that an intra-picture pixel value and the number of intra-picture pixels of the input video signal are xi and N, respectively, the luminance complexity calculation unit and the chrominance complexity calculation unit calculate the complexity of a luminance component and the complexity of a chrominance component using the following standard deviation $\sigma$ obtained when an average intra-picture value $\mu$, a squared differential error S from the average intra-picture value $\mu$ are defined as follows $$\mu = \sum_{i=0}^{N-1} (xi/N)$$

$$S = \sum_{i=0}^{N-1} (xi - \mu)^2$$

$$\sigma = \sqrt{S/(N-1)}.$$

9. A decoding device for decoding an encoded signal, comprising:
- an image conversion specification unit to calculate a type of format conversion performed at the time of encoding;
- a decoding unit to decode the encoded signal using the type of a format conversion from the image conversion specification unit; and
- an extension/conversion unit to convert a format of the signal decoded by the decoding unit using the type of a format conversion from the image conversion specification unit;
- wherein the encoded signal is generated by
  - calculating complexity of a luminance component in an input video signal,
  - calculating complexity of a chrominance component in the input video signal,
  - converting a format of the luminance component and the chrominance component using the complexity of the luminance component and the complexity of the chrominance component, and
  - compressing/encoding the converted video signal to generate the encoded signal,
- wherein a total number of pixels in the input video signal including pixels with chrominance and luminance components is maintained after converting the format.

10. The decoding device according to claim 9, wherein the image conversion specification unit calculates the type of format conversion using a preset value.

11. The decoding device according to claim 9, wherein the image conversion specification unit calculates the type of format conversion using information attached to each GOP (group of pictures) of the encoded signal.

12. The decoding device according to claim 9, wherein the image conversion specification unit calculates the type of format conversion using information attached to each picture of the encoded signal.

13. An encoding method for compressing/encoding an input video signal, comprising:
- calculating complexity of a luminance component in the input video signal;
- calculating complexity of a chrominance component in the input video signal;
- converting a format of the luminance component and the chrominance component using the complexity of the luminance component and the complexity of the chrominance component; and
- compressing/encoding the converted video signal to generate encoded data,
- wherein a total number of pixels in the input video signal including pixels with chrominance and luminance components is maintained after converting the format.

14. A decoding method for decoding an encoded signal, comprising:
- calculating a type of format conversion performed at the time of encoding;
- decoding the encoded signal using the type of format conversion from an image conversion specification unit; and
- converting a format of the signal decoded by a decoding unit using the type of format conversion from the image conversion specification unit;
- wherein the encoded signal is generated by
  - calculating complexity of a luminance component in an input video signal,
  - calculating complexity of a chrominance component in the input video signal,
  - converting a format of the luminance component and the chrominance component using the complexity of the luminance component and the complexity of the chrominance component, and
  - compressing/encoding the converted video signal to generate the encoded signal,
- wherein a total number of pixels in the input video signal including pixels with chrominance components and luminance components is maintained after converting the format.

15. A non-transitory storage medium on which is recorded a program for enabling an information processing device for compressing/encoding an input video signal to execute a process when the program is executed by the information processing device, the process comprising:
- calculating complexity of a luminance component in the input video signal;
- calculating complexity of a chrominance component in the input video signal;
- converting a format of the luminance component and the chrominance component using the complexity of the luminance component and the complexity of the chrominance component; and
- compressing/encoding the converted video signal to generate encoded data,
- wherein a total number of pixels in the input video signal including pixels with chrominance components and luminance components is maintained after converting the format.

16. A non-transitory storage medium on which is recorded a program for enabling an information processing device for decoding an encoded signal to execute a process when the program is executed by the information processing device, the process comprising:
- calculating a type of format conversion performed at the time of encoding;
- decoding the encoded signal using the type of format conversion from an image conversion specification unit; and
- converting a format of the signal decoded by a decoding unit on the basis of the type of format conversion from the image conversion specification unit;
- wherein the encoded signal is generated by
  - calculating complexity of a luminance component in an input video signal,
  - calculating complexity of a chrominance component in the input video signal,
  - converting a format of the luminance component and the chrominance component using the complexity of the luminance component and the complexity of the chrominance component, and
  - compressing/encoding the converted video signal to generate the encoded signal,
- wherein a total number of pixels in the input video signal including pixels with chrominance components and luminance components is maintained after converting the format.

* * * * *